United States Patent

Fujii et al.

[11] Patent Number: 5,958,309
[45] Date of Patent: Sep. 28, 1999

[54] METHOD FOR MANUFACTURING THERMOPLASTIC SHEETS BEARING EMBOSSED PATTERNS THEREON AND AN APPARATUS THEREFOR

[75] Inventors: Atsushi Fujii; Akira Funaki; Ryuji Moriwaki, all of Himeji, Japan

[73] Assignee: Idemitsu Petrochemical Co., Ltd., Tokyo, Japan

[21] Appl. No.: 08/811,567

[22] Filed: Mar. 5, 1997

[30] Foreign Application Priority Data

Mar. 6, 1996 [JP] Japan ..................... 8-048746

[51] Int. Cl.$^6$ .............. B29D 11/00; B29C 47/00
[52] U.S. Cl. ............ 264/1.6; 264/1.9; 264/216; 264/284; 425/385
[58] Field of Search .......... 264/1.6, 2.7, 210.2, 264/210.6, 216, 284, 1.9; 425/327, 373, 385

[56] References Cited

U.S. PATENT DOCUMENTS

| 4,601,861 | 7/1986 | Pricone et al. ............... 264/1.6 |
| 5,204,037 | 4/1993 | Fujii ........................... 264/216 |
| 5,658,514 | 8/1997 | Fujii et al. ................... 264/210.2 |
| 5,674,442 | 10/1997 | Morita ......................... 264/284 |

FOREIGN PATENT DOCUMENTS

| 60-56103 | 12/1985 | Japan . |
| 1-83092 | 6/1989 | Japan . |
| 3-6919 | 1/1991 | Japan . |
| 5-17023 | 3/1993 | Japan . |
| 6-55613 | 3/1994 | Japan . |
| WO93/13929 | 7/1993 | WIPO ........................ 264/1.6 |

*Primary Examiner*—Mathieu D. Vargot
*Attorney, Agent, or Firm*—Flynn, Thiel, Boutell & Tanis, P.C.

[57] ABSTRACT

Provided is a method for manufacturing a thermoplastic resin sheet bearing an embossed pattern, which employs a manufacturing apparatus having a first roll having an elastic material coated surface, a mirror-faced metal, endless belt, which is wound around the first roll and a second roll, and a third roll so provided that the metal, endless belt is wrapped partially around the third roll, which contacts the first roll via the metal, endless belt and which has an embossed pattern formed on one surface. According to this method, the thermoplastic resin sheet, partially melted, is fed between the metal, endless belt, which contacts the first roll, and the third roll. The elastic member is elastically deformed by application of a pressing force between the first and the third roll, while face pressure welding the thermoplastic sheet by using the first and the third rolls to transfer the embossed pattern and to cool the thermoplastic resin sheet. A surface temperature for the third roll of from 0° C. to (resin's Tg +20)°C. is maintained when the thermoplastic resin sheet is formed of an amorphous resin, and a surface temperature for the third roll of 0° C. to (resin's m.p. −30)°C. is maintained when the thermoplastic resin sheet is formed of a crystalline resin. Subsequently, face pressure welding of the thermoplastic resin sheet is performed by using the metal, endless belt relative to the third roll.

6 Claims, 4 Drawing Sheets

METHOD FOR MANUFACTURING THERMOPLASTIC SHEETS BEARING EMBOSSED PATTERNS THEREON AND AN APPARATUS THEREFOR

BACKGROUND OF THE INVENTION

1. Field of the Invention

The present invention relates to a method for manufacturing thermo-plastic sheets having an embossed pattern, and an apparatus therefor, to be used for manufacturing sheets having a reflective capability.

2. Description of Related Art

Recently, thermoplastic sheets having a reflective capability (plastic reflection panels), which are produced by performing a microprism process on the surface of thermoplastic sheets, have been employed in the reflection panel field, the fashion field, and the architectural field.

In the United States, reflective sheets of the glass bead type and cube corner types have been approved as sheets having a reflective capability. In general, the glass bead reflective sheets are superior for short-distance visibility, and the cube corner reflective sheets are superior for long-distance visibility and luminance because of their reflective capability.

When manufacturing a reflective sheet of the cube corner type, an embossed pattern on an embossed pattern forming die must be transferred exactly to a thermo-plastic sheet.

It is especially important when processing a thermoplastic sheet that it be pressed against an embossed pattern die at an adequate temperature and by the application of an adequate pressure, and that the application of the pressure be continued for a predetermined period of time.

A continuous pressing method (see Japanese Examined Patent Publication No. Sho 60-56103) and a belt method (see Japanese Examined Patent Publication No. Sho 5-17023) for manufacturing reflective sheets have been proposed as conventional methods that satisfy the above requirements.

With the continuous pressing method, an overlapping solid-state sheet material is continuously fed to a belt, and a plurality of pressing means having heating and cooling functions press embossed pattern molds against the sheet material to transfer patterns to the sheet material.

With the belt method, a belt bearing an embossed pattern mold and a thermoplastic sheet are gripped by a pair of rollers and pressed together to transfer the pattern to the sheet.

The production speed attained by the continuous pressing method, however, is slow, and the apparatus that is used is large and complicated.

Since for the belt method, the belt itself carries the embossed pattern, a problem arises concerning the durability of the belt that serves as the mold.

Although not presently being used for the manufacture of reflective sheets, the sheet manufacturing techniques described in Japanese Unexamined Patent Publication No. Hei 6-55613, Japanese Unexamined Utility Model Publication No. Hei 3-6919, and Japanese Unexamined Utility Model Publication No. Hei 1-83092 could be applied for the belt method for the manufacture of reflective sheets from a sheet resin that is melted and extruded through a die by an extruder.

However, were the technique described in Japanese Unexamined Patent Publication No. Hei 6-55613 used, the sheet would be insufficiently transparent when a nucleus-generating agent did not contain any additives. Also, were the technique in Japanese Utility Model Publication No. Hei 3-6919 used, if the molding speed was increased, the surface glossiness on the belt side would be degraded because the face pressing interval would be too short. Any technique in Japanese Unexamined Utility Model Publication No. Hei 1-83092 was used, even though an elastic member was employed, as this would be a belt that was coated with rubber, a problem would arise concerning its durability.

SUMMARY OF THE INVENTION

It is therefore one object of the present invention to provide a method by which thermo-plastic resin sheets, bearing a highly transparent embossed pattern, can be manufactured with high reproducibility, and an apparatus therefor.

According to the present invention, a method for manufacturing a thermo-plastic resin sheet bearing an embossed pattern, which employs a manufacturing apparatus, includes a first roll having an elastic material coated surface, a mirror-faced metal, endless belt, which is wound around the first roll and a second roll, and a third roll so provided that the metal, endless belt is wrapped partially around the third roll, which contacts the first roll via the metal, endless belt and which has an embossed pattern formed on one surface, comprises the steps of:

feeding the thermo-plastic resin sheet, partially melted, between the metal, endless belt, which contacts the first roll, and the third roll;

elastically deforming the elastic member by application of a pressing force between the first and the third roll, while face pressure welding the thermo-plastic sheet by using the first and the third rolls to transfer the embossed pattern and to cool the thermo-plastic resin sheet;

maintaining a surface temperature for the third roll of from 0° C. to (resin's Tg +20)°C. when the thermo-plastic resin sheet is formed of an amorphous resin;

maintaining a surface temperature for the third roll of 0° C. to (resin's m.p. −30)°C. when the thermo-plastic resin sheet is formed of a crystalline resin; and performing face pressure welding of the thermo-plastic resin sheet by using the metal, endless belt relative to the third roll.

The partially melted thermo-plastic resin sheet is one that is obtained immediately after the resin is melted and is extruded through the die of an extruder, or one that is obtained by heating a solid-state thermo-plastic resin sheet.

The thermo-plastic resin sheet of the present invention includes thermo-plastic resin sheets having relatively different thicknesses.

The thermo-plastic resin sheet may consist of a single layer or of multiple layers of thermo-plastic resin sheets.

The amorphous resin includes an acrylic resin, polycarbonate and poly(vinyl chloride). This resin may include a nucleus-generating agent, such as sorbitol, benzoic aluminum, polypropylene or sodium.

When the thermo-plastic resin sheet is formed of the amorphous resin and when the surface temperature of the third roll is higher than (resin's Tg +20)°C., mold breaking tends to occur when the sheet is peeled from the third roll. Preferably, the surface temperature is (resin's Tg)°C. or lower, and more preferably, (resin's Tg −10)°C. or lower.

The crystalline resin includes polypropylene.

When the thermo-plastic resin sheet is formed of the crystalline resin, and when the surface temperature of the third roll is higher than (resin's m.p. −30)°C., mold breaking tends to occur when the sheet is peeled from the third roll. Preferably, the surface temperature is (resin's m.p. −50)°C., and more preferably, (resin's m.p. −70)°C. or lower.

Temperature adjustment means employing water cooling, etc., can be provided for the third roll to hold its temperature within the above described temperature range.

Preferably, the temperature of the belt is maintained so that it is the same as that of the third roll.

According to the present invention, the surface roughness of the mirror finish of the metal, endless belt is, for example, 3 S or lower, preferably, 1 S or lower, and even more preferably 0.5 S or lower. When the surface roughness is greater than 3 S, it is difficult to obtain an appropriately smooth face for the thermo-plastic resin sheet.

The material used for the endless belt can be stainless steel, carbon steel, or a titanium alloy.

Although the endless belt has an arbitrary thickness, it is preferably 0.3 to 1.5 mm. When the belt is thinner than 0.3 mm, the strength of the belt is reduced and deterioration of its durability occurs. When the belt is thicker than 1.5 mm, the diameter of a roll around which the belt is installed must be increased, and the apparatus will therefore become larger. In addition, heating and cooling efficiency are degraded, and manufacturing costs are increased.

Although the kind of elastic material that is used is determined arbitrarily, a fluorocarbon rubber, silicone rubber, EPT, or EPDM can be used. The metal that is used for the elastic member may contain powdered silver or copper to provide increased thermal conductivity.

The thickness of the elastic member is preferably 1 mm or greater, and more preferably 3 mm or greater. When the elastic member is thinner than 1 mm, the elasticity effect is reduced, and the face welding pressure interval relative to the thermo-plastic resin sheet is reduced. In addition, cushioning is reduced, and a resin bank tends to occur in the portion of the thermo-plastic resin sheet fed between the endless belt and the third roll. The upper limit of the thickness is about 50 mm. When the thickness is greater than this, a problem with its durability or with its thermal conductivity tends to arise.

The embossed pattern is arbitrarily selected, but when the sheet is used as a sheet having a reflective capability, the embossed pattern is a triangular pyramidal diamond cut pattern (cube corner pattern). The size of the elements in a continuous arrangement that is employed to form the pattern is determined arbitrarily, and an element need only have a similar figure.

The first and the second rolls suffice for the rolls around which the metal, endless belt is installed. One more roll may be provided for the metal, endless belt to cool or to heat it on its way to the first roll.

According to the present invention, when a thermo-plastic resin sheet is to be fed between a metal, endless belt, which contacts the first roll, and the third roll, the thermo-plastic resin sheet contacts the endless belt and the roll at the same time. Thus, the transfer of the embossed pattern to the partially melted resin that has a low viscosity by the third roll can be accompanied by the elastic deformation of the elastic member. Then, since face pressure welding and cooling are performed by the third roll, the breaking of a mold, which occurs when the embossed pattern is peeled from the mold can be prevented. As a result, reproducibility for the embossed pattern can be increased.

When the thermo-plastic resin sheet is brought into contact with the metal, endless belt or the roll, the melting resin is cooled and solidified before the embossed pattern is transferred to it.

According to the present invention, it is preferable that the pressure during the face pressure welding of the thermoplastic resin sheet, which accompanies the elastic deformation of the elastic member, be 0.1 MPa to 20.0 MPa, and that the pressure during the face pressure welding of the thermoplastic resin sheet, which accompanies no elastic deformation of the elastic member, be 0.1 MPa to 0.5 MPa.

When the face pressure is equal to or lower than 0.1 MPa, transfer and cooling efficiency are deteriorated. Especially when the embossed pattern is transferred to the thermoplastic resin sheet, and when the processing speed is increased by employing a low face pressure, pattern blurring (the returning to the mold of the embossed pattern that has been transferred) tends to occur.

If the face pressure is higher than 20.0 MPa or 0.5 MPa, the belt tension is increased, and this is not preferable for its service life.

According to the present invention, an apparatus, for manufacturing a thermo-plastic resin sheet bearing an embossed pattern, comprises:

a first roll, which has an elastic material coated surface;

a metal, endless belt, which has a mirror-faced surface; and a third roll, the face of which is an embossed pattern, the third roll being so provided as to contact the first roll via the metal, endless belt and further to wrap the metal, endless belt around the third roll.

In short, this is an apparatus for carrying out the above described manufacturing method.

Another roll may be provided along the endless belt to increase the cooling efficiency for the metal, endless belt that moves toward the first roll.

In this invention, preferably the hardness (conforming to JIS K6301 A) of the elastic material is 95 degrees or less.

When the hardness is greater than 95 degrees, the elastic property is reduced, and a resin bank tends to appear when a partially melted thermo-plastic resin sheet is brought into contact with the third roll and the metal, endless belt at the same time to perform face pressure welding. The hardness of the elastic material is preferably 60 degrees or less.

DETAILED DESCRIPTION OF THE PREFERRED EMBODIMENT(S)

First Embodiment

Figure 1:
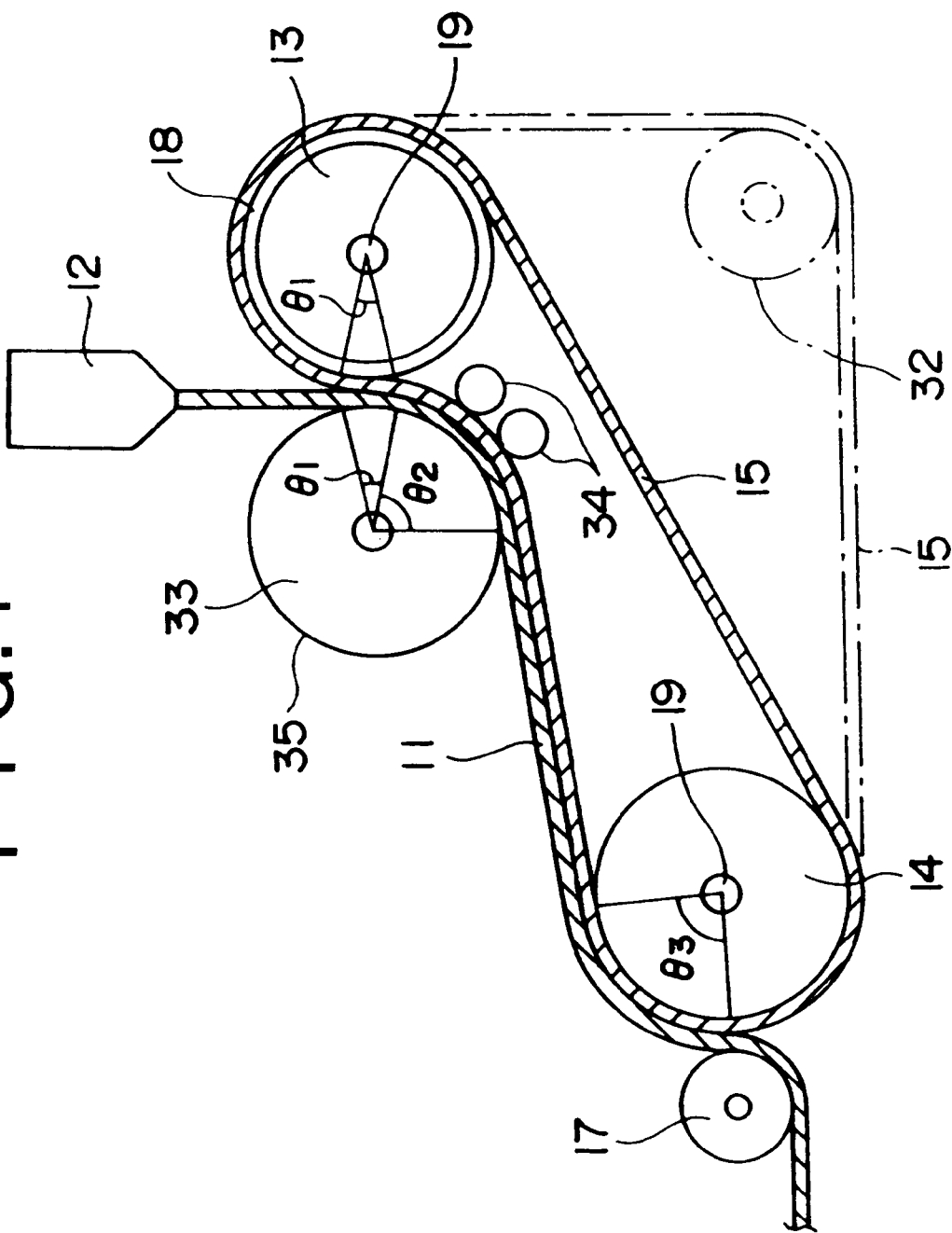
FIG. 1 is a schematic diagram, according to a first embodiment of the present invention, of an apparatus that is used for a method for manufacturing thermo-plastic resin sheets having an embossed pattern.

A method and an apparatus according to a first embodiment of the present invention for manufacturing a thermoplastic resin sheet 11 having an embossed pattern will now be described while referring to FIGS. 1 through 5.

The structure of the apparatus in the embodiment for manufacturing the thermo-plastic resin sheet 11 having an embossed pattern will be described.

The apparatus comprises a T die 12 of an extruder, a metal, endless belt that is wound around a first roll 13 and a second roll 14; a third roll 33, for an embossed pattern formation, that contacts the first roll 13 via the metal, endless belt 15; and a fourth roll 17, provided in the vicinity of the second roll 14, and two pressing rolls (back rolls) 34 for pressing the thermo-plastic resin sheet 11.

The first roll 13 is coated with an elastic material 18, such as a silicone rubber. The elastic material 18 has a hardness (conforming to JIS K6301A) of 95 degrees or less, and a thickness of 1 mm to 50 mm.

The metal, endless belt 15 is formed of stainless steel, and has a mirror finish face whose surface roughness is equal to or less than 0.5 S.

At least one of the rotary shafts 19 of the first and the second rolls 13 and 14 is coupled to rotating driving means (not shown).

Figure 2:
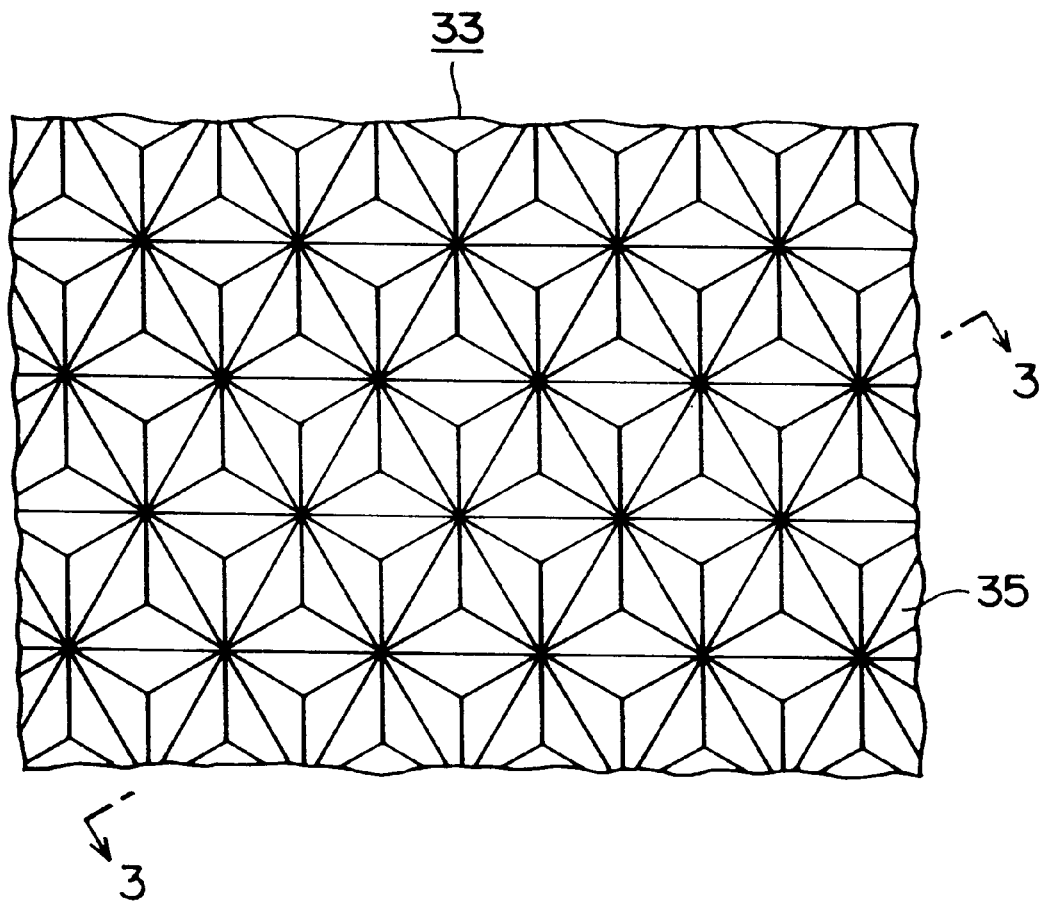
FIG. 2 is an enlarged diagram showing an embossed pattern formation roll according to the first embodiment of the present invention.
Figure 3:
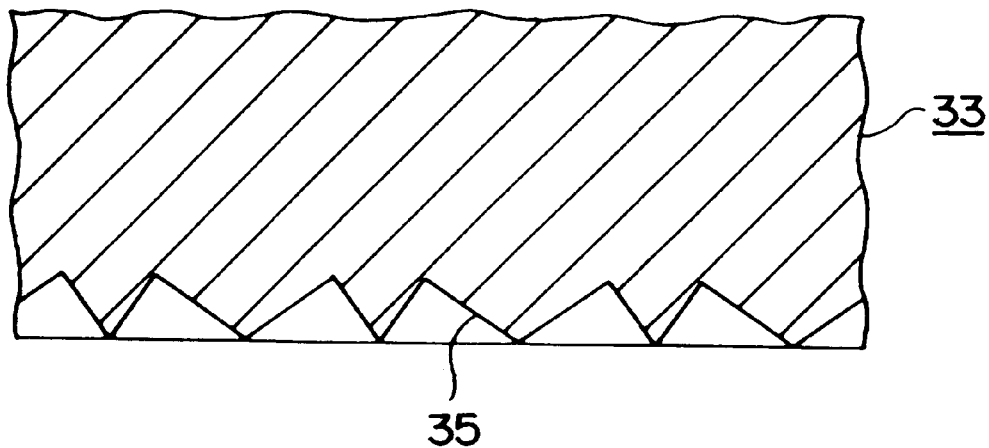
FIG. 3 is a cross-sectional view taken along line A—A in FIG. 2.
Figure 4:
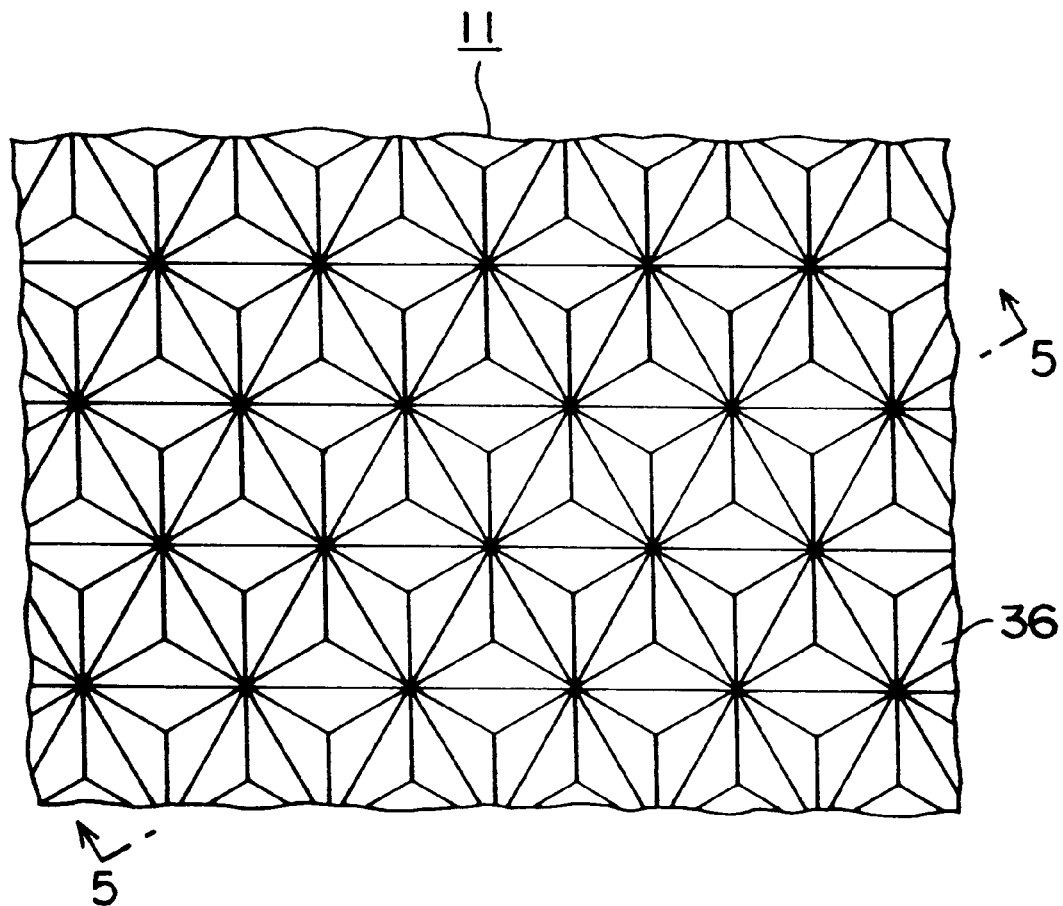
FIG. 4 is an enlarged diagram illustrating the thermoplastic resin sheet having an embossed pattern according to the present invention.
Figure 5:
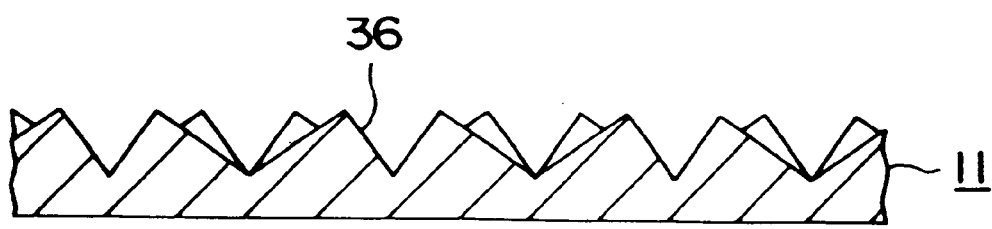
FIG. 5 is a cross-sectional view of line B—B in FIG. 4.

As is shown in FIGS. 2 and 3, a mold 35 is formed on the outer, peripheral surface of the third roll 33 to transfer an embossed pattern 36 (see FIGS. 4 and 5) to the thermo-plastic resin sheet 11. The mold 35 has a raised and recessed profile that corresponds to a triangular pyramid diamond cut pattern for a sheet having a reflective capability.

The third roll 33 is located at the position where the endless belt 15 extending between the first and the second rolls 13 and 14 is recessed inward, as if one part of the outer periphery of the third roll 33 were wrapped in the endless belt 15. More specifically, during the manufacturing process for the thermo-plastic resin sheet 11 having an embossed pattern, the endless belt 15 and the sheet 11 drifts while being wrapped around one part of the outer periphery of the third roll 33. The two pressing rolls 34 are so located that they press the thermo-plastic resin sheet 11 against the embossed pattern formation roll 33 from the rear face of the endless belt 15.

The fourth roll 17 is used to guide the thermo-plastic resin sheet, so that the endless belt 15 performs face pressure welding of the sheet 11 at one part of the outer periphery of the second roll 14.

A water cooled temperature adjustment means (not shown) for regulating the surface temperatures is provided for the rolls 13, 14, 32 and 33.

As is indicated by a chain line in FIG. 1, another roll 32 may be provided before the first roll 13 along the metal, endless belt 15 in order to increase the cooling efficiency of the endless belt 15 that goes to the first roll 13.

An explanation will now be given for the method employed in this embodiment, which uses the above described apparatus, to manufacture a thermo-plastic resin sheet 11 having an embossed pattern in this embodiment.

First, the temperature of the third roll 33 is controlled to maintain a surface temperature of 0° C. to (resin's Tg +20)°C. when the thermoplastic resin sheet 11 is formed of an amorphous resin, and a surface temperature of 0° C. to (resin's m.p −30)°C. when the thermoplastic resin sheet 11 is formed of crystalline resin.

After the thermo-plastic resin sheet 11 is melted and extruded by the T die 12 of the extruder, the sheet 11 is fed between the first roll 13 and the embossed pattern formation roll 33, the sheet 11 contacting the endless belt 15, which is in contact with the first roll 13, and the third roll 33 at substantially the same time. The sheet 11 is then welded under pressure applied by the rolls 13 and 33 and cooled. At this time, the elastic material 18 is compressed and elastically deformed by a pressing force exerted between the first roll 13 and the third roll 33 and is elastically deformed. In the surface area described by angles $\theta_1$ originating at the centers of the rolls 13 and 33, where the elastic material 18 is elastically deformed, face pressure welding is performed on the sheet 11 by the rolls 13 and 33, and the embossed pattern of the mold 35 on the roll 33 is transferred to the sheet 11. The face pressure applied to the sheet 11 is 0.1 MPa to 20.0 MPa.

Sequentially, the thermo-plastic resin sheet 11 is pressed against the third roll 33 by the endless belt 15 and cooled. The sheet 11, which is pressed against the roll 33 by the pressing rolls 34 via the endless belt 15, is wrapped around the roll 33 the distance described by an angle $\theta_2$ originating at the center of the roll 33, and face pressure welding of the sheet 11 is performed by the endless belt 15 and the roll 33 or in the surface area described by the angle $\theta_2$, while the face pressure relative to the sheet 11 at this time is 0.01 MPa to 0.5 MPa.

Then, the thermo-plastic resin sheet 11 is moved to the second roll 14 by the travel of the endless belt 15. The sheet 11 on which the embossed pattern is formed is pressed against the second roll 14 under pressure applied via the endless belt 15, and cooled. Within the surface area described by an angle $\theta_3$ originating at the center of the roll 14, face pressure welding of the sheet 11, which is guided by the second roll 17 and is wrapped around the second roll 14, is performed. The face pressure at this time is 0.01 MPa to 0.5 MPa.

According to this embodiment, within the surface areas of the first roll 13 and the embossed pattern formation roll 33 that are described by the angles $\theta_1$, while the elastic material 18 is elastically deformed, face pressure welding and cooling of the sheet 11 are performed by the rolls 13 and 33, via the endless belt 15, to transfer the embossed pattern 36 to the sheet 11. Thus, the embossed pattern 36 can be formed at a high speed on the thermo-plastic resin sheet 11 that has been melted and extruded. The resultant sheet 11 bearing the embossed pattern 36 has satisfactory transparency.

Following the face pressure welding and the cooling, within the surface area described by the angle $\theta_2$ of the embossed pattern formation roll 33, face pressure welding and cooling are performed on the sheet 11 by the endless belt 15 and the roll 33, and at the surface area of the second roll 14 described by the angle $\theta_3$, face pressure welding and the cooling are performed on the sheet 11 by the endless belt 15 and the second roll 14. As a result, the transparency of the thermo-plastic resin sheet 11 can be further improved.

Second Embodiment

Figure 6:
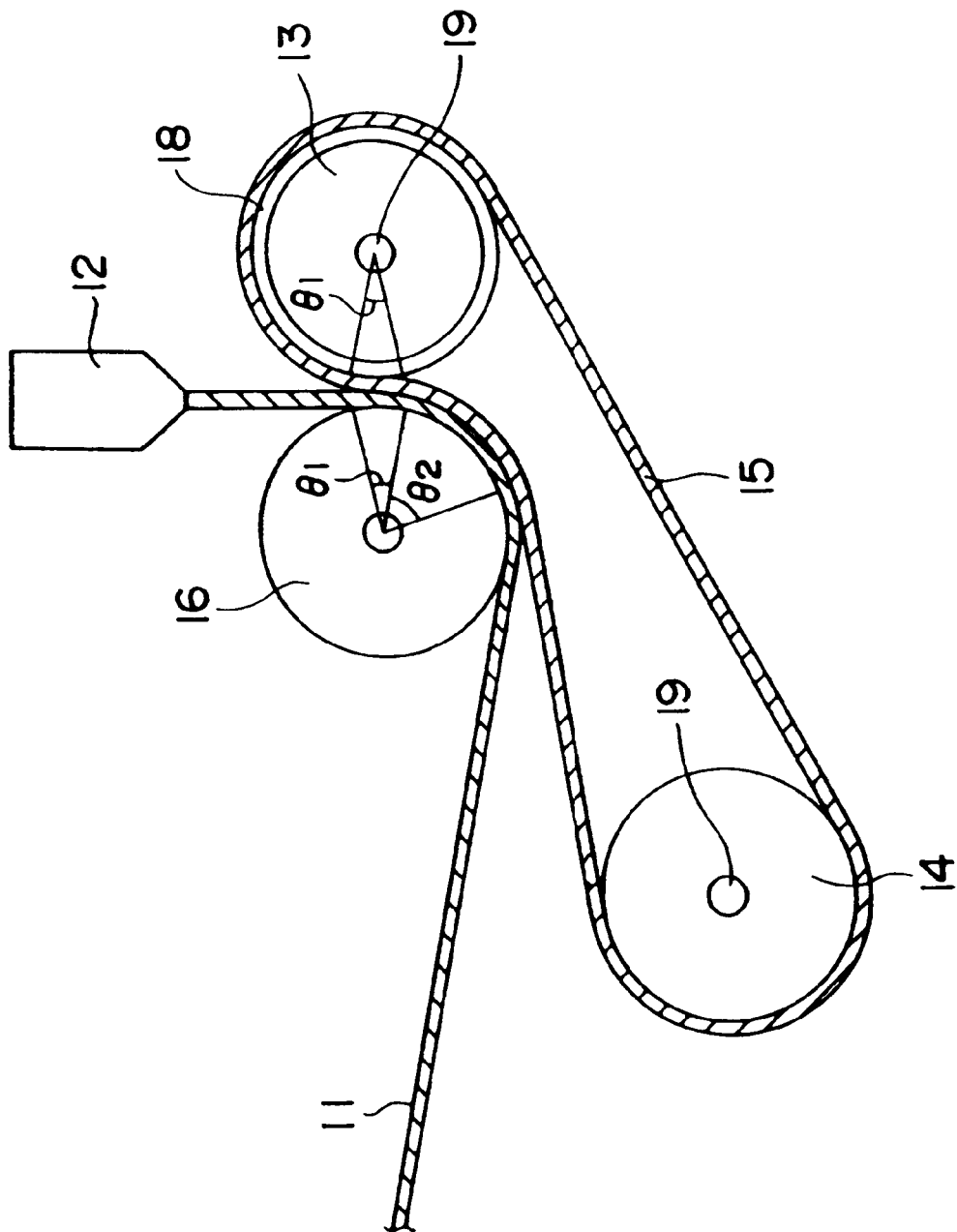
FIG. 6 is a schematic diagram according to the second embodiment of the present invention illustrating an apparatus that is used for a method for manufacturing the thermoplastic resin sheet having an embossed pattern.

A method and an apparatus according to a second embodiment of the present invention for manufacturing a thermo-plastic resin sheet 11 having an embossed pattern will now be described while referring to FIG. 6.

The apparatus in the embodiment differs from the apparatus of the first embodiment in the following ways.

In the apparatus in this embodiment, while the fourth roll 17 of the first embodiment is not provided, a first roll 13 coated with an elastic material 18, a second roll 14, a metal, endless belt 15 and a third roll 16 are provided in the same manner.

The manufacturing method for the thermo-plastic resin sheet 11, which is employed by the above apparatus, differs from the method used in the first embodiment in that the face pressure welding and cooling are not performed on a sheet 11 that is guided by a fourth roll 17 while using the endless belt 15.

The partially melted thermo-plastic resin sheet 11, which is extruded by a T die 12 in an extruder, is fed between the first and the third rolls 13 and 16. Face pressure welding is performed for the sheet 11 by the first and the third rolls 13 and 16, and the sheet 11 is then cooled. Following this, face pressure welding of the resultant thermo-plastic resin sheet 11 is performed relative to the third roll 16 along the mirror-faced endless belt 15, and the sheet 11 is then cooled.

According to the present invention, at the surface areas described by the angles $\theta_1$ on the first and the third rolls 13 and 16, while the elastic material 18 is elastically deformed, face pressure welding and cooling are performed on the sheet 11 by the rolls 13 and 16, as it is carried along the endless belt 15, to transfer an embossed pattern 36 to the sheet 11. Therefore, the embossed pattern 36 can be transferred at a high speed to the thermo-plastic resin sheet 11 that has been melted and extruded. In addition, the resultant sheet 11 bearing the embossed pattern 36 has superior transparency.

In addition to the above face pressure welding and cooling, face pressure welding and cooling are also performed on the sheet 11 by the endless belt 15 and the embossed pattern formation roll 16 at the surface area of the roll 16 described by the angle $\theta_2$. Thus, the transparency of the thermo-plastic resin sheet 11 can be further enhanced.

Embodiment 1

In Embodiment 1, the conditions for the manufacturing apparatus and method were specifically determined as follows.

Diameter of the screw of a single screw extruder: 65 mm

Width of T die: 600 mm

Thermoplastic resin:

poly(vinyl chloride) 50 weight %

(polymerization degree: 1000, Tg: 60° C.)

Resin additive:

plasticizer 45 weight % of DOP(di-2-ethyl hexylphthalate)

stabilizer 0.1 weight % of stearic zinc propylene 0.1 weight % of stearic barium Thickness of thermoplastic resin sheet: 0.3 mm Elastic material:

silicone rubber having a thickness of 10 mm and a hardness of 50 degrees

Line speed: 3 m/min

Surface temperature of third roll: 50° C.

Embodiment 2

Only the material for the sheet and the surface temperature of the third roll were changed in the method in Embodiment 1.

Thermal plastic resin: polypropylene (m.p.: 160° C.)

Surface temperature of third roll: 70° C.

Embodiment 3

Only the material for the sheet and the surface temperature of the third roll were changed in the method in Embodiment 1.

Thermal plastic resin: polycarbonate (Tg: 145° C.)

Surface temperature of third roll: 140° C.

Comparison Example 1

Only the surface temperature of the third roll was changed in the method in Embodiment 1.

Surface temperature of third roll: 85° C.

Comparison Example 2

Only the surface temperature of the third roll was changed in the method in Embodiment 1.

Surface temperature of third roll: 140° C.

Comparison Example 3

Only the surface temperature of the third roll was changed in the method in Embodiment 1.

Surface temperature of third roll: 170° C.

For Embodiments 1 through 3 and Comparison Examples 1 through 3, the obtained thermo-plastic resin sheets were evaluated. The results are shown in Table 1 below.

The evaluation references in Table 1 are as follows.

⊙ . . . sufficient reflective capability x . . . no reflective capability

TABLE 1

| | Sheet resin | Third roll temperature (° C.) | Performance |
|---|---|---|---|
| Embodiment 1 | poly(vinyl chloride) | 50 | ⊙ |
| Embodiment 2 | polypropylene | 70 | ⊙ |
| Embodiment 3 | polycarbonate | 140 | ⊙ |
| Comparison example 1 | poly(vinyl chloride) | 70 | x |
| Comparison example 2 | polypropylene | 140 | x |
| Comparison example 3 | polycarbonate | 160 | x |

As is apparent from Table 1, the thermo-plastic resin sheets 11 bearing the embossed pattern in Embodiments 1 through 3 were obtained by the apparatus described in the above embodiments. These sheets 11 were manufactured with a surface temperature for the third roll 33 of zero to (resin's Tg+20)°C. when the resin for the sheet 11 was an amorphous resin, and with a surface temperature for the third roll 33 of zero to (resin's m.p. −30)°C. when the resin for the sheet 11 was a crystal resin. It is obvious that the embossed pattern of the mold 35 was satisfactorily transferred to the sheet 11, and that the sheet 11 had a sufficient reflective capability.

In Comparison Example 1, although the thermo-plastic resin sheet bearing an embossed pattern was obtained by the apparatus described in the embodiments, the surface temperature of the third roll 33 was higher than 80° C., which is (resin's Tg +20)°C., so that the mold transfer was defective due to the mold breaking when the embossed pattern was peeled from the mold, and no reflective capability was confirmed.

In Comparison Example 2, although the thermo-plastic resin sheet bearing an embossed pattern was obtained by the apparatus described in the embodiments, the surface temperature of the third roll 33 was higher than 130° C., which is (resins' m.p −30)°C., so that the mold transfer was defective due to the mold breaking when the embossed pattern was peeled from the mold, and no reflective capability was confirmed.

In Comparison Example 3, although the thermo-plastic resin sheet bearing an embossed pattern was obtained by the apparatus described in the embodiments, the surface temperature of the third roll 33 was higher than 165° C., which is (resins' Tg +20)°C., so that no reflective capability was confirmed as in the preceding comparison examples.

What is claimed is:

1. A method of manufacturing an amorphous thermoplastic resin sheet having an embossed pattern comprising the steps of:

providing a manufacturing apparatus comprising a first roll having an outer surface coated with an elastic material, a second roll, a third roll having an embossed pattern provided on an outer surface thereof and a metal endless belt having a mirror-finished surface wound around said first and second rolls and in contact with said third roll;

feeding the amorphous thermoplastic resin sheet, in a partially molten state, between the metal endless belt and the third roll;

maintaining the outer surface temperature of the third roll of from 0° C. to the amorphous thermoplastic resin's Tg;

elastically deforming the elastic material by applying a pressing force between said first and third rolls to conduct face pressure welding of said amorphous thermoplastic resin sheet and cool and transfer the embossed pattern to the amorphous thermoplastic resin sheet; and performing face pressure welding of the amorphous thermoplastic resin sheet having the embossed pattern thereon between the metal endless belt and the third roll.

2. A method of manufacturing a crystalline thermoplastic resin sheet having an embossed pattern comprising the steps of:

providing a manufacturing apparatus comprising a first roll having an outer surface coated with an elastic material, a second roll, a third roll having an embossed pattern provided on an outer surface thereof and a metal endless belt having a mirror-finished surface wound around said first and second rolls and in contact with said third roll;

feeding the crystalline thermoplastic resin sheet, in a partially molten state, between the metal endless belt and the third roll;

maintaining the outer surface temperature of the third roll of from 0° C. to the crystalline thermoplastic resin's m.p. −30° C.;

elastically deforming the elastic material by applying a pressing force of from 0.1–20 MPa between said first and third rolls to conduct face pressure welding of said crystalline thermoplastic resin sheet and cool and transfer the embossed pattern to the crystalline thermoplastic resin sheet; and performing face pressure welding of the crystalline thermoplastic resin sheet having the embossed pattern thereon between the metal endless belt and the third roll at a pressure of from 0.1–0.5 MPa.

3. A method for manufacturing a crystalline thermoplastic resin sheet bearing an embossed pattern according to claim 2, wherein, said surface temperature of said third roll is between zero and the resin's m.p. −50° C.

4. A method for manufacturing an amorphous thermoplastic resin sheet bearing an embossed pattern according to claim 1, wherein the pressure during said face pressure welding of said thermoplastic resin sheet is 0.1 MPa to 20.0 MPa, and wherein said pressure during said face pressure welding of said thermoplastic resin sheet having the embossed pattern thereon is from 0.1 MPa to 0.5 MPa.

5. A method for manufacturing an amorphous thermoplastic resin sheet bearing an embossed pattern according to claim 1, wherein the surface roughness of the mirror-finished surface of said metal endless belt is 3 S or lower.

6. A method for manufacturing a crystalline thermoplastic resin sheet bearing an embossed patter according to claim 2, wherein the surface roughness of the mirror-finished surface of said metal endless belt is 3 S or lower.

* * * * *

UNITED STATES PATENT AND TRADEMARK OFFICE
CERTIFICATE OF CORRECTION

PATENT NO. : 5 958 309
DATED : September 28, 1999
INVENTOR(S) : Atsushi FUJII et al It is certified that error appears in the above-identified patent and that said Letters Patent is hereby corrected as shown below:

Column 10, line 29, change "patter" to ---pattern---.

Signed and Sealed this

Twenty-eighth Day of November, 2000

Attest:

Q. TODD DICKINSON

Attesting Officer

Director of Patents and Trademarks